3,481,907
COPOLYMERS OF α,β-ALKYLENIMINES AND
γ-LACTONES
Rene M. J. Roberts, Charleston, W. Va., assignor to
Union Carbide Corporation, a corporation of New
York
No Drawing. Filed July 27, 1966, Ser. No. 568,136
Int. Cl. C08g 20/30
U.S. Cl. 260—78.3                          4 Claims

ABSTRACT OF THE DISCLOSURE

Copolymers of and α,β-alkylenimine and a γ-lactone. Representative is a copolymer of ethyleneimine and γ-butyrolactone.

---

This invention relates to novel copolymers prepared by reaction of α,β-alkylenimines and γ-lactones. These novel copolymers are useful for a variety of purposes, for example, they find utility as molding and casting resins, and as coating compositions for metal coating.

The α,β-alkylenimines employed in preparing the novel copolymers of this invention are compounds of the general formula:

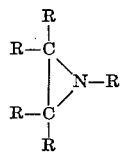

wherein each R is independently a member selected from the group consisting of hydrogen and alkyl of 1 to 4 carbon atoms and the total number of carbon atoms in the molecule is from 2 to 10. Illustrative of the suitable α,β-alkylenimines there may be mentioned: ethylenimine, 1,2-propylenimine, 1,2-butylenimine, 2,3-butylenimine, 1,1-dimethylethylenimine, 1,1-diethylethylenimine, N-methylethylenimine, N-propylethylenimine, N-butylethylenimine, and the like.

The γ-lactones employed in preparing the novel copolymers of this invention are compounds of the general formula:

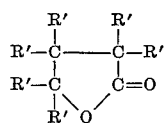

wherein each R' is independently a member selected from the group consisting of hydrogen and alkyl of 1 to 4 carbon atoms and the total number of carbon atoms in the molecule is from 4 to 10. Illustrative of the suitable γ-lactones there may be mentioned: γ-butyrolactone, γ-valerolactone, β-ethyl-γ-butyrolactone, β,β-dimethyl-γ-butyrolactone, β-butyl-γ-butyrolactone, β,β-diisopropyl-γ-butyrolactone, and the like.

To prepare the novel copolymers of this invention, an α,β-alkylenimine, as described hereinabove, is reacted with a γ-lactone, as described hereinabove, and the solid copolymeric reaction product is recovered from the reaction mixture. The reaction proceeds by ring opening and the product is a solid linear copolymer having a molecular weight which is typically in the range from about 500 to about 2000. The exact structure of the copolymer is not known but it is believed to be a mixture of copolymers of different structure.

The reaction of the α,β-alkylenimine and the γ-lactone can be effected in bulk but it is advantageous to employ an inert solvent as the reaction may, in some instances, proceed violently in the absence of a solvent. Inert solvents that are suitable for this purpose include, among others, aliphatic esters such as ethyl acetate, 2-ethylhexyl acetate, ethyl propionate, ethyl isobutyrate, and the like, aliphatic amides such as dimethylformamide, di-n-propylformamide, and the like, aliphatic ketones such as acetone, methyl ethyl ketone, diethyl ketone, methyl n-propyl ketone, diisobutyl ketone, and the like, nitriles such as acetonitrile, and ethers such as methyl ethyl ether, ethyl ether, isopropyl ether, 1,4-dioxane, tetrahydrofuran, and the like.

Suitable catalysts to promote the reaction are strong acids, such as sulfuric acid, hydrochloric acid, hydrobromic acid, and the like, or Lewis acid catalysts such as, for example, boron trifluoride etherate, zinc chloride, aluminum chloride, and the like.

Reaction of an α,β-alkylenimine and a γ-lactone in accordance with this invention can be carried out at temperatures of from about 0° C., or less to about 80° C., or more, preferably at temperatures from about 20° C. to about 60° C. and at pressures from subatmospheric to superatmospheric as desired. The time required for the reaction will depend upon such factors as the particular starting materials employed, the solvent, the temperature, and the catalyst, and will ordinarily be in the range from several minutes to several hours. The reactants may be admixed in equimolar proportions or either reactant may be employed in excess.

The invention is further illustrated by the following examples of its practice.

Example 1

To a 500-ml. rocker autoclave there was charged 43 grams (0.5 mole) of γ-butyrolactone dissolved in 100 cc. of 1,4-dioxane and then the autoclave was cooled with a Dry Ice/acetone bath until the solution was frozen. The autoclave was then charged with a solution of 21.5 grams (0.5 mole) of ethylenimine in 50 cc. of 1,4-dioxane and after the resulting admixture was frozen in a solution of 1.0 cc. of boron trifluoride etherate in 25 cc. of 1,4-dioxane was slowly added. The admixture was reacted overnight at 50° C. under a nitrogen pressure of 500 p.s.i. to yield 18.5 grams of a copolymer of ethylenimine and γ-butyrolactone. The copolymer, a white powder, was washed twice with ethyl ether and dried overnight under reduced pressure. Its essential analysis was as follows: C: 48.76, H: 9.06, N: 18.45. The copolymer gave a clear brittle plaque on molding at 220° C. and 2000 p.s.i.

Example 2

Under identical conditions to those described in Example 1 above. 43 grams of γ-butyrolactone dissolved in 100 cc. of 1,4-dioxane was reacted with 7.2 grams of ethylenimine dissolved in 50 cc. of 1,4-dioxane. The reaction yielded 7.0 grams of a copolymer of ethylenimine and γ-butyrolactone, a white powder having a molecular weight of 744±25 by vapor pressure osometry.

Example 3

To a 500 cc. Parr bomb cooled in a Dry Ice/acetone bath there was charged 43 grams (0.5 mole) of γ-butyrolactone dissolved in 100 cc. of 1,4-dioxane. After the solution was frozen, 0.5 cc. of sulfuric acid was added and allowed to freeze, whereupon a solution of 21.5 grams (0.5 mole) of ethylenimine in 50 cc. of 1,4-dioxane was slowly added to the bomb. The bomb was maintained at ambient temperature overnight with the reaction mixture under a nitrogen pressure of 500 p.s.i. The reaction yielded 1 gram of a copolymer of ethylenimine and γ-butyrolactone, a white powder which gave a yellow brittle plaque on molding at 210° C. and 2000 p.s.i.

Example 4

To a 500-ml. 4-neck flask there was charged a solution of 50 grams (0.5 mole) of γ-valerolactone in 100 cc. of 1,4 - dioxane and a solution of 21.5 grams (0.5 mole) of ethylenimine in 50 cc. of 1,4-dioxane was added dropwise over a period of two hours with rapid agitation. At the end of this period a solution of 1 cc. of boron trifluoride etherate dissolved in 10 cc. of 1,4-dioxane was added dropwise to the flask over a period of one-half hour. After a reaction period of 8 hours at 50° C., there were recovered 6.9 grams of a copolymer of ethylenimine and γ-valerolactone, with the following elemental analysis: C: 54.32, H: 9.92, N: 14.00. The copolymer was a brown, sticky, water-insoluble, resinous material.

Although the invention has been illustrated by the foregoing examples it is not to be limited to the specific materials employed therein but only as set forth in the following claims.

What is claimed is:

1. A resinous copolymer of (1) an α,β-alkylenimine of the general formula:

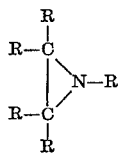

wherein each R is independently a member selected from the group consisting of hydrogen and alkyl of 1 to 4 carbon atoms and the total number of carbon atoms in the molecule is from 2 to 10 and (2) a γ-lactone of the general formula:

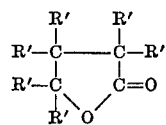

wherein each R' is independently a member selected from the group consisting of hydrogen and alkyl of 1 to 4 carbon atoms and the total number of carbon atoms in the molecule is from 4 to 10.

2. The copolymer as described in claim 1 wherein the α,β-alkylenimine is ethylenimine.

3. The copolymer as described in claim 1 wherein the α,β-alkylenimine is ethylenimine and the γ-lactone is γ-butyrolactone.

4. The copolymer as described in claim 1 wherein the α,β-alkylenimine is ethylenimine and the γ-lactone is γ-valerolactone.

References Cited

UNITED STATES PATENTS 3,036,974   5/1962   Trieschmann _____ 260—2

OTHER REFERENCES

"Title page—Table of Contents page," Jour. Poly. Sci., vol. 3, part B, "Polymer Letters," Aug. 2, 1965.

Kagiya et al., J. Polymer Science, vol. 3, part B, pp. 617–623 (1965), "Polymer Letters."

Kagiya et al., Chem. Abstracts 64, 11324h (1966).

Kagiya et al., Kogyo Kagaku Zasshi 68(9), 1741-7 (1965).

HAROLD D. ANDERSON, Primary Examiner

E. NIELSEN, Assistant Examiner

U.S. Cl. X.R.

117—161, 132